(12) United States Patent
Atapattu et al.

(10) Patent No.: US 10,531,673 B2
(45) Date of Patent: Jan. 14, 2020

(54) DRY BLEND FOR MAKING ANALOGUE CHEESE

(71) Applicant: Allied Blending & Ingredients, Inc., St. Louis, MO (US)

(72) Inventors: Chandrani Atapattu, St. Louis, MO (US); John Fannon, St. Louis, MO (US)

(73) Assignee: Allied Blending, LP, Keokuk, IA (US)

( * ) Notice: Subject to any disclaimer, the term of this patent is extended or adjusted under 35 U.S.C. 154(b) by 0 days.

(21) Appl. No.: 13/835,846

(22) Filed: Mar. 15, 2013

(65) Prior Publication Data
US 2013/0243926 A1 Sep. 19, 2013

Related U.S. Application Data

(60) Provisional application No. 61/611,922, filed on Mar. 16, 2012, provisional application No. 61/732,054, filed on Nov. 30, 2012.

(51) Int. Cl.
*A23C 20/00* (2006.01)
*A23C 19/086* (2006.01)

(52) U.S. Cl.
CPC .......... *A23C 20/00* (2013.01); *A23C 19/086* (2013.01)

(58) Field of Classification Search
CPC ............................ A23C 20/00; A23C 19/086
USPC .................................................. 426/582
See application file for complete search history.

(56) References Cited

U.S. PATENT DOCUMENTS

| | | | |
|---|---|---|---|
| 4,499,116 A | 2/1985 | Zwiercan et al. | |
| 5,244,687 A | 9/1993 | Rybinski et al. | |
| 5,277,926 A | 1/1994 | Batz et al. | |
| 5,807,601 A | 9/1998 | Carpenter et al. | |
| 5,935,634 A | 8/1999 | Gamay | |
| 6,120,809 A | 9/2000 | Rhodes | |
| 6,319,526 B1 | 11/2001 | Dahlstrom et al. | |
| 6,998,145 B2 | 2/2006 | Henry et al. | |
| 7,291,356 B2 | 11/2007 | Merrill et al. | |
| 7,651,715 B2 | 1/2010 | Merrill et al. | |
| 7,807,207 B2 | 10/2010 | Huang | |
| 7,976,886 B2 | 7/2011 | Merrill et al. | |
| 2003/0008056 A1 | 1/2003 | Henry | |
| 2005/0271789 A1 | 12/2005 | Merrill | |
| 2006/0062885 A1 | 3/2006 | Jacobson | |
| 2006/0134297 A1* | 6/2006 | Bell | 426/582 |
| 2009/0061065 A1 | 3/2009 | Reyes | |
| 2011/0229622 A1 | 9/2011 | Merrill | |
| 2013/0122177 A1 | 5/2013 | Fannon et al. | |
| 2013/0243926 A1 | 9/2013 | Atapattu | |
| 2013/0295265 A1 | 11/2013 | Fannon et al. | |
| 2014/0154388 A1 | 6/2014 | Fannon et al. | |
| 2018/0249728 A1 | 9/2018 | Galal | |

FOREIGN PATENT DOCUMENTS

| | | |
|---|---|---|
| CA | 2161713 A1 | 5/1996 |
| CA | 2161713 C | 1/2007 |
| CN | 1988806 | 6/2007 |
| EP | 635215 A1 | 1/1995 |
| EP | 2030507 A2 | 3/2009 |
| KR | 20070063473 A | 6/2007 |
| WO | 199625051 A1 | 8/1996 |
| WO | 9926482 A1 | 6/1999 |
| WO | 2001049123 A1 | 7/2001 |
| WO | 200505107486 A2 | 11/2005 |
| WO | 200505107486 A3 | 11/2005 |
| WO | 2008054232 A1 | 5/2008 |
| WO | 2010091834 A1 | 8/2010 |
| WO | 2013070874 | 5/2013 |
| WO | 2013070874 A1 | 5/2013 |
| WO | 2013070874 A3 | 5/2013 |
| WO | 2013138728 | 9/2013 |
| WO | 2013138728 A3 | 9/2013 |
| WO | 2013138728 A3 | 9/2013 |
| WO | 2013165956 A1 | 11/2013 |
| WO | 2013165956 A3 | 11/2013 |
| WO | 2014085250 A3 | 3/2014 |
| WO | 2014085250 | 6/2014 |
| WO | 2014085250 A3 | 6/2014 |
| WO | 2015061679 A3 | 2/2015 |
| WO | 2015061679 A1 | 4/2015 |

OTHER PUBLICATIONS

Chavan, Rupesh S.et al., Cheese Substitutes: An Alternative to Natural Cheese—A Review, International Journal of Food Science, Technology & Nutrition, 2007, vol. 2., pp. 25-39.
European Search Report, EP Application No. 13760286.8, dated Oct. 14, 2015, 5 pgs.
Atapattu, C et al., Dry Blend for Making Analogue Cheese, Allied Blending & Ingredients Inc., US 20130243926 A1, Non-final rejection, dated Feb. 23, 2016.
Atapattu, C et al., Dry Blend for Making Analogue Cheese, Allied Blending & Ingredients Inc., US 20130243926 A1, Non-final rejection, dated Aug. 28, 2014.
European Search Report, EP Application No. 12848223.9, dated Jun. 16, 2015, 6 pgs.
Extended European Search Report, EP Application No. 13784139.1, dated Aug. 31, 2015, 6 pages.
Anonymous, Apr. 2010, Instant Three Cheese Sauce, Database GNPD, Mintel, Database accession No. 1303078, URL:www.gnpd.com, XP002757861 [X] 1,4-8.
Anonymous, Grated Italian Cheese Blend, Database GNPD, Mintel, Database accession No. 507363, URL:www.gnpd.com, XP002757862 [X] 12-17.

(Continued)

*Primary Examiner* — Jeffrey P Mornhinweg
(74) *Attorney, Agent, or Firm* — Dennis A. Bennett; Clifford A. Schlecht; Brock Levin

(57) ABSTRACT

Disclosed herein are cheese analogue compositions and the manufacturing processes in making the same with characteristics similar to that of natural cheeses. These products have properties such as melt, stretch, firmness, body and shredability similar to natural cheese products.

13 Claims, No Drawings

(56) References Cited

OTHER PUBLICATIONS

Fannon J et al., Dry Blend for Making Extended Cheese Product, Allied Blending & Ingredients Inc, US20130122177A1, Non-final rejection, dated Sep. 27, 2013.
Fannon J et al., Dry Blend for Making Extended Cheese Product, Allied Blending & Ingredients Inc, US20130122177A1, Non-final rejection, dated Jul. 31, 2014.
Fannon J et al., Dry Blend for Making Extended Cheese Product, Allied Blending & Ingredients Inc, US20130122177A1, Non-final rejection, dated Apr. 10, 2015.
Fannon J et al., Dry Blend for Making Extended Cheese Product, Allied Blending & Ingredients Inc, US20130122177A1, Non-final rejection, dated Jan. 11, 2016.
Fannon J. et al., Dry Blend for Making Extended Cheese Product, Allied Blending & Ingredients Inc., US20130295265A1, Non-final rejection, dated Dec. 5, 2013.
Fannon J. et al., Dry Blend for Making Extended Cheese Product, Allied Blending & Ingredients Inc., US20130295265A1, Non-final rejection, dated Sep. 10, 2014.
Fannon J. et al., Dry Blend for Making Extended Cheese Product, Allied Blending & Ingredients Inc., US20130295265A1, Non-final rejection, dated May 7, 2015.
Fannon J. et al., Dry Blend for Making Extended Cheese Product, Allied Blending & Ingredients Inc., US20130295265A1, Final rejection, dated Feb. 25, 2016.
Fannon J et al., Dry Blend for Making Cheese Analogue, Allied Blending & Ingredients Inc., US20140154388A1, Non-final rejection, dated Jun. 11, 2015.
Fannon J et al., Dry Blend for Making Cheese Analogue, Allied Blending & Ingredients Inc., US20140154388A1, Final rejection, dated Mar. 28, 2016.
Fannon J et al., Improved Dry Blend for Making Extended Cheese Product, Allied Blending & Ingredients Inc., WO2013070874A1—International Preliminary Report on Patentability Chapter I, dated May 13, 2014.
Fannon J et al., Improved Dry Blend for Making Analogue Cheese, Allied Blending & Ingredients Inc., WO2013138728A1—International Preliminary Report on Patentability Chapter I, dated Sep. 16, 2014.
Fannon J et al., Improved Dry Blend for Making Extended Cheese Product, Allied Blending & Ingredients Inc., WO2013165956A1—International Preliminary Report on Patentability Chapter I, dated Nov. 4, 2014.
Fannon J et al., Improved Dry Blend for Making Cheese Analogue, WO2014085250A1—International Preliminary Report on Patentability Chapter I, dated Jun. 2, 2015.
U.S. Appl. No. 14/087,676; Applicant Initiated Interview Summary dated Jul. 30, 2018; 3 pages.
U.S. Appl. No. 15/893,064; Non-Final Office Action dated Jul. 12, 2018; 31 pages.
U.S. Appl. No. 14/087,676; Non-Final Office Action dated Jun. 20, 2016; 23 pages.
Fannon J et al., Dry Blend for Making Extended Cheese Product, Allied Blending & Ingredients Inc, US20130122177A1, Final rejection, dated Oct. 25, 2016.
Fannon J et al., Dry Blend for Making Extended Cheese Product, Allied Blending & Ingredients Inc, US20130122177A1, Non-final rejection, dated Jun. 9, 2017.
Fannon J et al., Dry Blend for Making Extended Cheese Product, Allied Blending & Ingredients Inc, US20130122177A1, Final rejection, dated Apr. 18, 2018.
Fannon J. et al., Dry Blend for Making Extended Cheese Product, Allied Blending & Ingredients Inc., US20130295265A1, Final rejection, dated Aug. 9, 2017.
Fannon J. et al., Dry Blend for Making Extended Cheese Product, Allied Blending & Ingredients Inc., US20130295265A1, Non-final rejection, dated Oct. 27, 2016.
Fannon J et al., Dry Blend for Making Cheese Analogue, Allied Blending & Ingredients Inc., US20140154388A1, Non-final rejection, dated Oct. 14, 2016.
Fannon J et al., Dry Blend for Making Cheese Analogue, Allied Blending & Ingredients Inc., US20140154388A1, Final rejection, dated Sep. 22, 2017.
Fannon J et al., Dry Blend for Making Cheese Analogue, Allied Blending & Ingredients Inc., US20140154388A1, Declaration, Affidavit-traversing rejectns or objectns rule 132, Mar. 30, 2018.
Fannon J et al., Improved Dry Blend for Making Analogue Cheese, Allied Blending & Ingredients Inc., WO2013138728A1, Written Opinion of International Searching Authority, dated Sep. 19, 2013.
Fannon J et al., Improved Dry Blend for Making Extended Cheese Product, Allied Blending & Ingredients Inc., WO2013070874A1, Written Opinion of International Searching Authority, dated Mar. 15, 2013.
Fannon J et al., Improved Dry Blend for Making Extended Cheese Product, Allied Blending & Ingredients Inc., WO2013165956A1, Written Opinion of International Searching Authority, dated Sep. 25, 2013.
Fannon J et al., Improved Dry Blend for Making Cheese Analogue, WO2014085250A1, Written Opinion of International Searching Authority, dated Mar. 24, 2014.
Atapattu, C et al., Use of Humectants in Analog Cheese, Allied Blending & Ingredients Inc., WO2015061679A1, International Preliminary Report on Patentability Chapter I, dated May 6, 2016.
Atapattu, C et al., Use of Humectants in Analog Cheese, Allied Blending & Ingredients Inc., WO2015061679A1, Written Opinion of International Searching Authority, dated Feb. 9, 2015.
U.S. Appl. No. 14/087,676; Final Office Action dated Jan. 30, 2019; 27 pages.
U.S. Appl. No. 13/671,773; Non-Final Office Action, dated Nov. 30, 2018; 13 pages.
U.S. Appl. No. 15/893,064; Non-Final Office Action, dated Nov. 30, 2018; 23 pages.
U.S. Appl. No. 13/671,773; Final Office Action, dated Apr. 4, 2019; 13 pages.
U.S. Appl. No. 15/893,064; Final Office Action, dated Apr. 4, 2019; 23 pages.
Bachman, H., "Cheese Analogues: A Review", Int Diary J., 11:505-515, (2001).
Mounsey, J. et al., "Alteration of Imitation Cheese Structure and Melting Behaviour with Wheat Starch", Eur Food Res Tech., 226(5):1013-9, (2008).
Solowiej, B. et al., "The Effect of pH and Modified Maize Starches on Texture, Rheological Properties and Meltability of Acid Casein Processed Cheese Analogues", Eur Food Res Technol., 242(9):1577-85, (2016).
U.S. Appl. No. 13/671,773; Applicant-Initiated Interview Summary, dated Apr. 25, 2019; 3 pages.
U.S. Appl. No. 13/671,773; Non-Final Office Action, dated Jun. 27, 2019; 17 pages.
U.S. Appl. No. 15/893,064; Applicant-Initiated Interview Summary, dated Apr. 25, 2019; 3 pages.

* cited by examiner

DRY BLEND FOR MAKING ANALOGUE CHEESE

This application claims the benefit of priority of U.S. provisional applications No. 61/611,922, filed Mar. 16, 2012, and No. 61/732,054, filed Nov. 30, 2012, the disclosures of which are hereby incorporated by reference as if written herein in their entireties.

Analogue cheese products are generally described as products that look like cheese, but in which constituents including milk fat have been partly or completely replaced by other ingredients. Codex Alimetarious Commision, 1995 describes analogue cheese products as products that look like cheese in which milk fat has been replaced by other fats. However, cheese analogue compositions are not controlled by FDA regulations. Analogue cheeses vary from each other based on flavor, nutritional values, functionality, and in their applications. Many flavors of analogue cheese are found in the market, including American, Cheddar, and Monterrey Jack, and can be purchased in blocks, shreds, slices, or sauces. Other categories of analogue cheeses are available as blends with natural cheese products. New technologies in manufacturing analogue cheese products make these products available to the fast growing vegetarian and vegan consumer market. Manufacturers are looking into cheese analogues as a cost effective alternative to natural cheese.

Cheese is widely used in fast foods and readymade conventional meals. Cheese is an essential component in frozen pizzas. The costs associated with natural cheese, seasonal price fluctuation, and storage requirements have prompted the fast food industry to search for alternatives to natural cheese. Foodservice and industrial manufacturers have been turning to analogue or imitation cheese products for a number of years due to these products' attractive price and functionality. Increasingly, companies are discovering that analogue products are solutions to economic down turn in the local and international markets. Subsequently, manufacturers have been eager to develop analogue cheese products with competitive taste and functionalities at low costs. Many solutions available to manufacturers required casein proteins as part of the formulations. Therefore, these solutions have not been immune to the high cost or the price fluctuations for dairy products and ingredients.

In recent years, there has been a significant increase in demand for cheese generally, as well as for cheeses with specific performance or nutritional characteristics. This general demand is driven in part by the steady growth in the ready meal or convenience food sector of the food industry since cheese is an ingredient in many foods within this sector. The increasing popularity of various pizza-type products is one specific example of cheese-containing products in this sector that have contributed to the surge in demand. These concerns, as well as cost considerations, have been the impetus for the development of a number of analogue cheeses (e.g., imitation cheeses or cheese substitutes) that offer various health advantages (e.g., replacement of animal fat with healthier vegetable oil and increased vitamin or mineral levels) and cost benefits (e.g., vegetable oils are less expensive than certain dairy ingredients).

Analogue cheeses constitute a major category of cheese. As alluded to above, there has been an increased demand for analogue cheese because of cost and health considerations. Analogue cheese generally refers to a cheese in which milk fat and/or a protein source has been substituted with a source that is not native to milk. Analogue cheeses are typically lower cost than other cheese types because the processing can be performed less expensively and because certain milk ingredients can be substituted with cost effective food ingredients (e.g., substituting vegetable oil for milk fat). The health benefits derive from substitution of the milk fat and protein with other healthier substitutes and the ability to add other ingredients that can improve the nutritional characteristics of the final product.

Analogue cheeses are typically categorized as dairy, partial dairy, or nondairy, depending on whether the fat and/or dairy components are from dairy or vegetable sources. They can also be classified as being an imitation cheese or a substitute cheese. Imitation cheese is a substitute for and resembles another cheese but is nutritionally inferior to that cheese. A cheese substitute, on the other hand, resembles another cheese but is not nutritionally inferior to that cheese.

However, replacing conventional cheese composition ingredients can present technical hurdles because cheese compositions are complex and their properties can be sensitive to modified or inherent functional characteristics associated with micro and macro structures of these ingredients. Thus, conventional cheese manufacturing has come to rely on certain cheese composition ingredients to provide certain properties. Exemplary technical challenges include finding substitute ingredients that provide cheese compositions with one or more suitable functional properties (e.g., melt, stretch, and firmness), organoleptic properties (e.g., texture and flavor), and when necessary, nutritional properties.

Conventional manufacturers include three key components in cheese analogues, namely dry ingredient blend, water, and fats. Dry ingredient blends may contain combinations of ingredients such as starches, stabilizers, dairy and non-dairy proteins, emulsifying salts, emulsifiers, pH adjusters, fibers, colorants, and flavors. In currently available cheese analogues, inclusion of dairy proteins is crucial in achieving the desirable melt and stretch of similar to that of natural cheese products. Dairy proteins fall within two major categories; whey protein and casein protein. Besides adding nutritional value, whey proteins, in processed cheese type or analogue type products, are assumed to play a role in emulsion stability due to their amphophilic primary structure. Similarly, casein proteins add nutritional value in addition to their strong emulsification properties associated with the hydrophobic nature of the primary and tertiary structures. However, dairy protein based analogues limit the purpose of using these ingredients as low cost alternatives for natural cheeses. Often, dairy proteins, specifically casein proteins, are equal in cost to natural cheeses. Manufacturers and researchers continue their efforts to eliminate casein proteins form their formulations to be competitive in the market place.

In the existing market, casein protein is one of the major components of analogue cheeses. Most commonly, rennet casein is used in analogue cheese manufacturing. The inherent hydrophobic nature of casein proteins contribute to the stretch and melt of cheese. When included in a composition, the surface hydrophobicity or the hydrophobic patches of rennet casein micelles is believed to contribute to the stretch observed in analogue cheeses produced to substitute mozzarella-type cheese. Over the last few years, the price of casein has dramatically increased. Accordingly, there is an ongoing need in the cheese industry for a substitute for casein in manufacturing analogue cheeses. Manufacturers and researchers have been working on finding suitable substitute ingredients that are functionally compatible with casein proteins. The complex nature of casein micelles and casein proteins makes it difficult to find an individual ingredient that could cost effectively replace casein proteins. Starch based ingredients in combination with other food ingredients such as, but not limited to, stabilizers, emulsifiers, emulsifying salts, pH adjusters and proteins can be used to reduce or eliminate the need for the use of casein in making analogue cheeses. These findings allow analogue cheese manufacturers to use casein proteins only as a preferred ingredient, not as a crucial ingredient in making products with desired functionality in melt and stretch.

It has been a challenge to find the types of starches and ingredient compositions to replace casein protein while maintaining the desired functional, organoleptic, and/or nutritional properties of the cheese analogue composition. For example, replacing casein with starch can provide a cheese composition with less than desired functional properties (e.g., melt, stretch, and firmness) because starch is not necessarily always a "functional" replacement of casein protein, but can merely replace a certain mass of casein protein. Similarly, starch can impart a different, sometimes less desirable, flavor and/or texture to the cheese composition than provided by casein. Furthermore, replacing casein protein with starch, a carbohydrate, can significantly alter the nutritional characteristics of a cheese composition. Thus, conventional analogue cheese making has come to rely on the mere presence and sometimes quantity of casein protein to provide certain cheese compositions with cheese-like properties.

Despite these limitations, there exists a strong desire (e.g., economic incentives) to further reduce the amount of casein protein in certain cheese compositions. Many demographics receive most of their proteins and/or carbohydrates from a single source, such as rice. The availability of low-cost cheese adds diversity to their diets, and allows protein intake from other food sources. Demographics that traditionally include cheese in their diets are able to include cheese even in a recessed economic climate with the availability of low-cost cheeses. However, providing suitable functional, organoleptic, and nutritional characteristics while reducing the casein protein in cheese compositions presents significant technical challenges.

Another component commonly found in analogue cheeses is a fat source. In general, recent consumer trends indicate that trans-fatty acids (i.e., "trans-fat") in food products and food intermediates are being avoided by consumers to help increase the healthfulness of their diet. Food manufacturers are eager to shelve food items with consumer friendly label of 'trans-fat free' to be competitive in the market place. In making analogue cheese, manufacturers have an advantage of being able to select the type of fat desired to satisfy their labeling requirements. Accordingly, many food product marketers are finding ways to provide consumers with food products having reduced and/or substantially no trans-fat content. To help meet consumer demand many food manufacturers would like to provide consumers with food products (e.g., analogue cheeses and food products that include cheese (e.g., snack food (e.g., frozen snack food) including pizza, pizza-type snack food, and the like)) having a low amount of trans-fat (e.g., about 5% or less by weight of trans-fat based on the total weight of the fat component).

It has been a challenge to the manufacturers or researchers who work in the area of cheese analogues to create a 100% analogue product that has the stretch properties of a natural cheese product. Typically, starch companies recommend and express the need to use casein protein as at least a part of the formula to get the same stretching properties as mozzarella cheese. Starch companies recommend using octenyl succinic anhydride (OSA) starches as emulsifiers. Surprisingly, the hydrophobic nature of OSA appears to impart stretching properties to analogue cheese allowing it to have similar functional properties to mozzarella. However, these starches have not been used or recommended to create the hydrophobic attractions between starch molecules to make a product stretch in absence of casein proteins.

Similarly, it has been a challenge to create a product that would be firm enough for shredding, cubing, or slicing, but that would still melt when heated. Surprisingly, using oxidized starches in combination with stabilizers and/or emulsifying salts appear to help overcome this challenge.

Firmness, shredability, meltability, and stretch of analogue cheese rely on a combination of factors. Firmness must be in a range that would allow shred through commercial shredders without creating excessive amounts of fines. Cheese analogues should not stick to the shredder, or clog the shredding device causing manufacturing delays.

Fats and oils in the food composition should be appropriately emulsified, resulting in stable emulsions in the finished analogue product. The emulsion stability is critical and must be maintained even after melting cheese in the final application, such as pizza cheese or melting cheeses. The product also needs to be stable under fluctuating temperature conditions during storage and transportation. Emulsion stability is critical in analogue cheese products made with starches and in manufacturing cheese analogue products using equipment commonly used in cheese or processed cheese manufacturing. Oiling-off during processing is another hurdle analogue cheese manufacturers have to overcome in making a successful end/finished product. Finished products of analogue cheese made with ingredients other than dairy proteins (mostly casein protein) generally exhibit syneresis. Syneresis in these products is assumed to result from the contraction of starch molecules. Selection of suitable stabilizers/thickeners to prevent syneresis has been a challenge. Furthermore, lack of naturally released emulsifiers, precisely casein molecules from casein micelles, make it difficult to make analogue cheese in the absence of caseins.

It has been discovered that formulating a combination of stabilizers, emulsifying salts, and emulsifiers in starch- or starch/protein-based analogue cheese compositions produces a stable finished product that is compatible with cheese currently used in pizza and other cheese melt applications.

SUMMARY OF INVENTION

It has been a challenge to create a product that would be firm enough for shredding or cubing and melt and stretch when heated with or without the use of casein or natural cheeses. It has been discovered that manipulation of surface morphology and inherent structures of starches with or without proteins make analogue cheeses that have excellent flexibility with respect to formulation changes. The resulting analogue cheeses can exhibit substantially the same or improved properties (e.g., functional/processing properties, organoleptic properties, combinations of these, and the like) over a range of significantly different cheese formulations. Specifically, the analogue cheeses disclosed herein contain higher levels of modified starches with significantly less protein than existing analogue cheeses, which provides body and firmness, while maintaining meltability when heating the finished product. Extensive application of modified starches imparts stretching characteristics when these analogue cheeses are heated. However, these analogue cheeses can also be sliced, shredded, or cubed, similar to natural cheese.

There is disclosed a dry blend which can be used in making analogue cheese products by combining with fat and water. This blend can be also used in making processed cheese type products, mozzarella type products, cheddar type products with or without combining with natural cheeses or cheese curd. Specifically, there is disclosed a dry blend useful in creating a product that has desirable melt and stretch properties as a 100% analogue, due to the repulsive forces of oxidized starches and use of hydrophobic attractions between the modified starches, respectively.

Further Embodiments Disclose

A pre-filled cheese analogue package having a dry blend comprising:
a. 40%-95% starch;
b. 0%-10% emulsifying salts; and
c. 0%-20% stabilizers,
wherein said dry blend is homogenously blended and filled into said pre-filled cheese analogue package.

In an embodiment, a pre-filled cheese analogue package has a dry blend, comprising:
a. 55%-95% starch;
b. 0%-10% emulsifying salts; and
c. 0%-10% stabilizers,
wherein said dry blend is homogenously blended and filled into said pre-filled cheese analogue package.

In an embodiment, a pre-filled cheese analogue package has a dry blend, comprising:
a. 65%-90% starch;
b. 0%-10% emulsifying salts; and
c. 0%-5% stabilizers,
wherein said dry blend is homogenously blended and filled into said pre-filled cheese analogue package.

In an embodiment, a pre-filled cheese analogue package has a dry blend, comprising:
a. 75%-85% starch;
b. 0%-10% emulsifying salts; and
c. 0%-3% stabilizers
wherein said dry blend is homogenously blended and filled into said pre-filled cheese analogue package.

In an embodiment, said package further comprises whey.
In an embodiment, a pre-filled cheese analogue package has a dry blend, comprising:
a. 40%-70% starch;
b. 0%-30% whey;
c. 0%-10% emulsifying salts; and
d. 0%-20% stabilizers,
wherein said dry blend is homogenously blended and filled into said pre-filled cheese analogue package.

In an embodiment, a pre-filled cheese analogue package has a dry blend, comprising:
a. 40%-70% starch;
b. 5%-25% whey;
c. 0%-10% emulsifying salts; and
d. 2%-13% stabilizers,
wherein said dry blend is homogenously blended and filled into said pre-filled cheese analogue package.

In an embodiment, a pre-filled cheese analogue package has a dry blend, comprising:
a. 45%-65% starch;
b. 14%-20% whey;
c. 2%-8% emulsifying salts; and
d. 3%-12% stabilizers,
wherein said dry blend is homogenously blended and filled into said pre-filled cheese analogue package.

In an embodiment, a pre-filled cheese analogue package has a dry blend, comprising:
a. 45%-65% starch;
b. 15%-30% whey;
c. 0%-10% emulsifying salts; and
d. 0%-20% stabilizers,
wherein said dry blend is homogenously blended and filled into said pre-filled cheese analogue package.

In an embodiment, a pre-filled cheese analogue package has a dry blend, comprising:
a. 50%-60% starch;
b. 20%-25% whey;
c. 4%-8% emulsifying salts; and
d. 2%-11% stabilizers,
wherein said dry blend is homogenously blended and filled into said pre-filled cheese analogue package.

In an embodiment, said cheese analogue package has a dry blend further comprising an acidulant.

In an embodiment, said cheese analogue package has a dry blend further comprising 0%-3% of an acidulant.

In an embodiment, said acidulant is chosen from acetic acid, citric acid, fumaric acid, malic acid, phosphoric acid, lactic acid, and tartaric acid.

In an embodiment, said acidulant is chosen from citric acid and acetic acid.

In an embodiment, said cheese analogue package has a dry blend further comprising casein.

In an embodiment, said emulsifying salts are chosen from sodium aluminum phosphate, sodium citrate, trisodium phosphate, disodium phosphate, and other sodium, calcium or potassium phosphate, tartrate, or citrate salts, and combinations thereof.

In an embodiment, said cheese analogue package has a dry blend further comprising coloring.

In an embodiment, said cheese analogue package has a dry blend further comprising a preservative or a mixture of preservatives.

Disclosed herein is an analogue cheese comprising the dry blend, a fat, water, and, optionally, cheese and/or cheese curds.

Disclosed herein is a method of making an analogue cheese comprising: combining a dry blend, a fat, water, and, optionally, cheese and/or cheese curds; mixing the ingredients to form a mixture; and heating and cooling the mixture to provide an analogue cheese.

In an embodiment, the method uses 0% cheese and/or cheese curds.

In an embodiment, the analogue cheese is shreddable and sliceable.

In an embodiment, the method uses 1-10% cheese and/or cheese curds.

In an embodiment, said pre-filled cheese analogue package has a dry blend containing less than 15% water.

In an embodiment, said pre-filled cheese analogue package has a dry blend containing less than 10% water.

In an embodiment, said pre-filled cheese analogue package has a dry blend containing less than 5% water.

In an embodiment, said analogue cheese is vegan.

In an embodiment, the cheese analogues can be 100% analogue or may contain some natural cheese in the final product. The inclusion of cheese and/or cheese curd is often to meet specific nutritional values in the end product. To that end, the final product may contain from 1%-90% cheese and/or cheese curd.

DETAILED DESCRIPTION

A "cheese analogue" as used herein refers generally to a cheese-like product manufactured using starches as the primary structure building ingredients. Currently available cheese analogues are typically categorized as dairy (all fats and proteins come from dairy sources), partial dairy (some fats and proteins come from dairy sources, while other have been replaced with non-dairy fats and proteins), or nondairy (all fats and proteins come from non-dairy sources). They can also be classified as being an imitation cheese or a substitute cheese. Imitation cheese is a substitute for and resembles another cheese but is nutritionally inferior to that cheese. A cheese substitute, on the other hand, resembles another cheese but is not nutritionally inferior to that cheese. Cheese analogues described herein may belong to "non-dairy" category and exhibit shredability, melt, stretch similar to that of natural cheese, and may ooze oil and make blisters when heated on pizza. These imitation cheeses can be converted into cheese substitutes by incorporating nutrients at desired levels without affecting their cheese-like functionality.

A "pre-filled cheese analogue package" is a package containing the dry blend that includes all the ingredients needed for a user to create an extended cheese product, such as, but not limited to, starches, gums, acidulants, whey, casein, emulsifiers, salts, and gelatin. These ingredients have been homogenously blended before being packaged.

Cheese analogues may be formed into products similar to natural and analogue cheese types, such as, but not limited to, mozzarella, cheddar, Gouda, and pizza cheese. These end products may have several technical advantages over their existing counterparts, including extended shelf-life, resistance to separation when cooked, and uniformity of product. Its production also enjoys significant economic advantages over traditional cheese-making processes, most often through the ability to incorporate any of a wide variety of less expensive ingredients.

Analogue pizza cheese is designed to have physical properties of firm body, machine shredability, melt on pizza creating blisters, brown spots, slightly oozing oil, and elasticity. These products remain thick and chewy after melting. It is commonly used on commercially produced pizzas in place of the more traditional mozzarella. Analogue pizza cheese is formulated so that it can be manufactured with basic cheese making equipment but without the additional equipment, processing, and cost of true mozzarella.

The essential role of the emulsifying agents in the manufacturing of processed cheese is firstly to chelate $Ca^{2+}$ ions from the casein-bound calcium phosphate and to increase the charge repulsion between the casein particles, and secondly to increase the pH of the system. These emulsifying agents can selectively convert casein micella into individual casein protein-random coils which eventually will act as emulsifiers in stabilizing oil-in-water emulsion in finished product. The role of emulsifying salts used in analogue cheese products with no casein protein is to adjust the pH in the finished product while maintaining the ionic strength required in stabilizing the starch molecules. Food grade salts that have the ability to function as ion-exchangers, buffers, and calcium sequesterants have been used as emulsifying salts. The emulsifying salts, typically alkaline sodium aluminum phosphate, disodium phosphate duohydrate and sodium citrate, or other sodium, calcium or potassium phosphate, tartrate, or citrate salts, reduce the tendency for tiny fat globules in the cheese to coalesce and pool on the surface of the molten cheese. Most common emulsifying salts used in analogue cheese manufacture are sodium citrates and sodium orthophosphates. Potassium salts are commonly used in combination with sodium salts in low salts formulas. Further, additional emulsifiers such as lecithin (liquid and powder form), diacetyl tartaric acid ester of mono- and diglycerides (DATEM), as well as mono- and diglycerides other emulsifiers commonly used in emulsions may be included in the dry blend.

A number of different types of starches can be incorporated into the dry blend. Suitable starches include vegetable starches (e.g., potato starch, arrowroot starch, pea starch, and tapioca) and grain starches (e.g., corn starch, wheat starch, and rice starch). Specific examples of suitable corn starches include dent corn starch, waxy corn or maize starch, and high amylose corn starch. The starches can be used individually or in combination. As noted above, starches can advantageously be included in the slurry. In some applications, the starch is added as a powder or unheated solution.

The starch can be modified or native. Modified starches, also called starch derivatives, are prepared by physically, enzymatically, or chemically treating native starch, thereby changing the properties of the starch. Modified starches are used in practically all starch applications, such as in food products as a thickening agent, stabilizer or emulsifier. Modified food starches differ in their degree of cross-linking, type of chemical replacement, oxidation level, degree of molecular scission, and ratio of amylose to amylopectin.

Stabilizers synergistic interaction improves the textural quality of foods. It imparts rich mouth feel without masking flavor, enhances moisture retention, prevents syneresis and ice crystal formation in frozen products and forms thermally reversible gels. Examples of suitable gums that can be incorporated include, but are not limited to, xanthan gum, guar gum, konjac flour and locust bean gum. Examples of suitable stabilizers include chondrus extract (carrageenan), pectin, gelatin, and agar. Blends of Xanthan Gum, Locust Bean Gum and Guar Gum are commonly used in the production of cheese analogues.

Acidulants are additives that give a sharp taste to foods by increasing the tartness or acidity. They also assist in the setting of gels and to act as preservatives. An acidulant (acidic agent) can be incorporated to adjust the pH of the finished cheese to a desired level. In combination with emulsifying salts, the acidulants in the dry blend will help maintain the pH at the desired level. The titratable acidity and pH of the cheese can be controlled to help regulate the melt down characteristics of the finished cheese. Various acids can be employed at the end of the cooking process; examples of suitable acids include, but are not limited to, acetic acid, citric acid, fumaric acid, lactic acid, malic acid, phosphoric acid, tartaric acid adipic acid, hydrochloric acid, glucano delta lactone, lactobionic acid or Genlac C, the latter being a blend of water, citric acid, lactic acid, and acetic acid. Acid is typically added to adjust the pH of the finished cheese to a pH from about 4.8-6.5 is reached.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, turmeric, titanium dioxide, and beta-carotene. Colorants may be of both the natural or artificial color. If one wished to color the cheese a red, an artificial color such as FD&C red #40 can be used. Annatto imparts a yellowish color to cheese. The yellowish color often is preferred by consumers who perceive it to indicate a "richer" product upon cooking on a pizza. Colorants can be incorporated into the final soft or firm/semi-hard ripened or unripened blended cheese product by inclusion in the slurry. If added at the mixing stage, the colorant is generally sprayed onto the heated cheese mass as an unheated solution or dispersion in water. The amount of colorant added is typically in the range of about 0.01 to 0.02%, based on the weight of the finished cheese. Turmeric, if used, is generally added in an amount of about 0.01 to 0.001%. If annatto is added, it normally is added to about 0.1 to 0.2% by weight.

Various flavoring agents can also be incorporated into the cheese to tailor the flavor profile of the cheese to meet consumer preferences. Suitable flavors for mixing into the heated cheese include, for example, natural mozzarella flavor such as diacetyl and/or lipolyzed fat, or enzyme modified cheese for cheddar cheese. Flavoring agents can be incorporated into the final soft or firm/semi-hard ripened or unripened blended cheese product by incorporation into the heated slurry or by addition to the heated cheese mass as a dry powder, or more typically as part of an unheated aqueous solution. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

Non-dairy fat can refer to various vegetable fats. These fats may be partially or fully hydrogenated, yielding a cheese product that is low in trans-fat. In an embodiment, the fat has a melting point close to that of butter fat, 93-103° F. Further, the fat may be blended with a liquid fat (oil) during the cheese making process.

Whey is the liquid remaining after milk has been curdled and strained. It is a by-product of the manufacture of cheese or casein and has several commercial uses. Sweet whey is manufactured during the making of rennet types of hard cheese like mozzarella, cheddar or Swiss cheese.

Cheese curds are an important step in the cheese making process. They are small chunks of cheese solids which have been separated from the natural whey present in milk, but not yet pressed into molds to make cheese. Different treatments of the curds yield different end cheeses, and the curds can also be eaten straight. The curdling process coagulates the solids in the milk, yielding cheese curds swimming in whey. The whey is drained from the curds, which may also be cut to facilitate drainage, and then the cheese curds can be salted, packed into molds, and turned into cheese.

Casein is the name for a family of related phosphoproteins ($\alpha S1$, $\alpha S2$, $\beta$, $\kappa$). These proteins are commonly found in mammalian milk, making up 80% of the proteins in cow milk and between 20% and 45% of the proteins in human milk. Casein has a wide variety of uses, from being a major component of cheese, to use as a food additive, to a binder for safety matches. As a food source, casein supplies amino acids; carbohydrates; and two inorganic elements, calcium and phosphorus. Casein contains a fairly high number of proline residues, which do not interact. There are also no disulfide bridges. As a result, it has relatively little tertiary structure. It is relatively hydrophobic, making it poorly soluble in water. It is found in milk as a suspension of particles called "casein micelles" which show only limited resemblance with surfactant-type micellae in a sense that the hydrophilic parts reside at the surface and they are spherical. However, in sharp contrast to surfactant micelles, the interior of a casein micelle is highly hydrated. The caseins in the micelles are held together by calcium ions and hydrophobic interactions. Types of casein commonly used in cheese making comprise, but are not limited to, rennet casein, acid casein, calcium caseinate, sodium caseinate, and potassium caseinate.

Preservatives may be included in the dry blend. Typical food grade preservatives, such as, but not limited to, sorbic acid, potassium sorbate, and cultured dextrose may be used to preserve the product.

Dry blend refers to the "dry" (i.e. less than 15% water) starting material one would use in make of extended cheese product. A dry blend is a homogenous mixture of the ingredients that may be sold as a pre-packaged mix to a cheese manufacturer or user. Normally water and some type of fat would be added to produce the extended cheese product. One could also add in a desired flavor to resemble the desired cheese taste.

The dry blend that is provide here for use in the extended cheese product is designed to improve: 1) melt and flow ability of the final cheese product, which is a measure of how well the cheese melts and flows into a homogenous mass, preferably with little or no individual shreds of cheese still detectable; 2) stretch, which is measure of the ability of the cheese to form interconnected strings when the heated cheese is pulled; 3) texture, which is a measure of chewiness and smoothness; 4) coloring, which is a measure of the actual color of the melted cheese; 5) blister characteristics, which may include size, color and extent of coverage; and/or 6) nutritional composition.

The dry blends described herein are manufactured it in one step by blending all the dry material contained in the formulas described herein in a double ribbon blender. These batches are blended during addition of the ingredients, and then blended an additional 10 minutes, or until a homogenous mixture is obtained, after all ingredients have been added. Optionally, a food grade oil can be sprayed on with the blender running, with an additional 10 minutes of blending, or until a homogenous mixture is obtained. The dry product obtained at the conclusion of the blending is packed and is ready to be packaged or used in the cheese making process.

DRY BLEND EXAMPLES

Examples 1-14 are for making a dry blend for use in making analogue cheese.

| Ingredient | Example 1 % Weight | Example 2 % Weight | Example 3 % Weight | Example 4 % Weight |
| --- | --- | --- | --- | --- |
| Whey | 21.64 | 24.82 | 21.64 | 24.82 |
| Acetylated di-starch adipate | 5.10 | 5.09 | 5.10 | 5.09 |
| Combination of Oxidized and Acetylated di-starch adipate | 45.12 | 48.26 | 45.12 | 48.26 |
| Gelatin | 4.00 | 4.00 | 4.00 | 4.00 |
| Calcium Sulfate | 0.80 | 0.80 | 0.80 | 0.80 |
| Casein | 5.00 | 0.00 | 5.00 | 0.00 |
| Sodium Aluminum Phosphate | 3.50 | 1.20 | 3.50 | 1.20 |
| Octenyl succinic anhydride (OSA) Starch | 4.00 | 5.00 | 4.00 | 5.00 |
| Xanthan Gum | 0.24 | 0.24 | 0.24 | 0.24 |
| Flour Salt | 5.40 | 5.40 | 5.40 | 5.40 |
| Sodium Citrate | 1.61 | 1.61 | 1.61 | 1.61 |
| Sorbic Acid | 0.40 | 0.40 | 0.40 | 0.40 |
| Potassium Sorbate | 0.60 | 0.60 | 0.60 | 0.60 |
| Sodium Diphosphate | 2.42 | 2.42 | 2.42 | 2.42 |
| Citric Acid | 0.16 | 0.16 | 0.16 | 0.16 |
| TOTAL | 100.00 | 100.00 | 100.00 | 100.00 |

| Ingredient | Example 5 % Weight | Example 6 % Weight |
|---|---|---|
| Whey | 18.00 | 14.94 |
| Acetylated di-starch adipate | 5.00 | 10.65 |
| Acetylated Starch | 0.00 | 25.36 |
| Rice Flour | 0.00 | 6.65 |
| Combination of Oxidized and Acetylated di-starch adipate | 44.88 | 0 |
| Acid-treated Starch | 8.00 | 9.32 |
| Gelatin | 5.00 | 4.16 |
| Calcium Sulfate | 0.80 | 0.83 |
| Casein | 0.00 | 13.83 |
| Sodium Aluminum Phosphate | 1.20 | 0.93 |
| Octenyl succinic anhydride (OSA) Starch | 6.00 | 2.5 |
| Xanthan Gum | 0.24 | 0.25 |
| Flour Salt | 5.40 | 4.99 |
| Sodium Citrate | 1.50 | 1.67 |
| Sorbic Acid | 0.40 | 0 |
| Potassium Sorbate | 0.60 | 0.84 |
| Sodium Diphosphate | 2.42 | 2.51 |
| Citric Acid | 0.16 | 0.17 |
| Mineral Oil | 0.00 | 0.4 |
| Titanium Dioxide | 0.40 | 0 |
| TOTAL | 100.00 | 100 |

| | Example # | | |
|---|---|---|---|
| | 7 % Weight | 8 % Weight | 9 % Weight |
| Oxidized Starch | 28.86 | 44.75 | 50.73 |
| Octenyl succinic anhydride (OSA) Starch | 53.29 | 31.44 | 25.46 |
| Whey | 0.00 | 5.01 | 5.01 |
| Flour Salt | 5.40 | 5.40 | 5.40 |
| Di-Sodium Phosphate | 1.50 | 2.00 | 2.00 |
| Sodium Citrate | 4.50 | 4.50 | 4.50 |
| Sodium Aluminum Phosphate | 1.20 | 1.20 | 1.20 |
| Calcium Sulfate | 0.80 | 0.80 | 0.80 |
| Potassium Sorbate | 0.60 | 0.60 | 0.60 |
| Sorbic Acid | 0.40 | 0.40 | 0.40 |
| Titanium Dioxide | 0.30 | 0.30 | 0.30 |
| Lecithin | 0.80 | 0.80 | 0.80 |
| Blend of Xanthan, Locust, and Guar Gums | 1.35 | 1.50 | 1.50 |
| Xanthan Gum | 0.50 | 0.50 | 0.50 |
| Citric Acid | 0.50 | 0.50 | 0.50 |
| Mineral Oil | 0.00 | 0.3 | 0.3 |
| TOTAL | 100.00 | 100.00 | 100.00 |

| | Example # | | |
|---|---|---|---|
| | 10 % Weight | 11 % Weight | 12 % Weight |
| Oxidized Starch | 51.00 | 56.05 | 51.00 |
| Octenyl succinic anhydride (OSA) Starch | 25.48 | 28.00 | 33.33 |
| Whey | 5.02 | 5.51 | 5.02 |
| Flour Salt | 5.40 | 5.93 | 5.40 |
| Di-Sodium Phosphate | 2.00 | 0.00 | 1.15 |
| Sodium Citrate | 4.50 | 0.00 | 0.00 |
| Sodium Aluminum Phosphate | 1.20 | 0.00 | 0.00 |
| Calcium Sulfate | 0.80 | 0.00 | 0.00 |
| Potassium Sorbate | 0.60 | 0.66 | 0.60 |
| Sorbic Acid | 0.40 | 0.44 | 0.40 |
| Titanium Dioxide | 0.30 | 0.33 | 0.30 |
| Lecithin | 0.80 | 0.88 | 0.80 |
| Blend of Xanthan, Locust, and Guar Gums | 1.50 | 1.65 | 1.50 |
| Xanthan Gum | 0.50 | 0.55 | 0.50 |
| Citric Acid | 0.50 | 0.00 | 0.00 |
| TOTAL | 100.00 | 100.00 | 100.00 |

-continued

| | Example # | |
|---|---|---|
| | 13 % Weight | 14 % Weight |
| Oxidized Starch | 51.00 | 51.00 |
| Octenyl succinic anhydride (OSA) Starch | 32.48 | 32.48 |
| Whey | 5.02 | 5.02 |
| Flour Salt | 5.40 | 5.40 |
| Di-Sodium Phosphate | 2.00 | 0 |
| Sodium Citrate | 0.00 | 0.00 |
| Sodium Aluminum Phosphate | 0.00 | 2.00 |
| Calcium Sulfate | 0.00 | 0.00 |
| Potassium Sorbate | 0.60 | 0.60 |
| Sorbic Acid | 0.40 | 0.40 |
| Titanium Dioxide | 0.30 | 0.30 |
| Lecithin | 0.80 | 0.80 |
| Blend of Xanthan, Locust, and Guar Gums | 1.50 | 1.50 |
| Xanthan Gum | 0.50 | 0.50 |
| Citric Acid | 0.00 | 0.00 |
| TOTAL | 100.00 | 100.00 |

The dry blends disclosed herein can be made into analogue cheese using generally used equipment in cheese industry. The process involves melting fat, mixing the dry blend with melted fat and water or with liquid oil and water, heating, cooling and optionally adding colors and flavors. The dry blends described herein are insensitive to the ingredient components addition order. The analogue cheese can be manufactured by adding dry blend to melted fat and then adding water, adding dry blend to water and then adding melted fat or adding dry blend to the mixture of fat and water. The three components, fat, water and dry blend are mixed together and heated to around 145-160° F. After allowing starches to hydrate, the temperature is further increased to 165-175° F. Melt reduced cheese analogues are made by continuing heating to temperatures higher than 180° F. In the event of incorporating cheese, cheese can be added either at the beginning of the cooking process or at the end of the cooking process.

Meltability and stretchability are mostly analyzed subjectively. A predetermined amount of shredded analogue cheese is spread on pizza crust covered with pizza sauce. The resulting pizza is either baked in an oven at 400-450° F. for around 7-13 minutes or baked in a microwave oven of 1100 watt for 2-3 minutes Melted pizza is subjectively analyzed for appearance, melt stretch, mouth feel, blistering and oiling.

Meltability is measured by cutting a disk of cheese of a specified size, and placing the disk in a glass Petri dish. A technician heats the Petri dish in an oven at an elevated temperature for a specified time (350° F. for seven minutes), then pulls the dish out and measures the diameter of the circle the melted cheese has formed.

The above dry blends will provide an ingredient to be used in making cheese analogues with improved melting and stretching properties.

It is understood that the examples and embodiments described herein are for illustrative purposes only and that various modifications or changes in light thereof will be suggested to persons skilled in the art and are to be included within the spirit and purview of this application and scope of the appended claims. The cheeses of the present invention may be made by the methods described herein, or by any other method that produces a finished cheese product having the same physical or chemical properties as the present cheeses. All publications, patents and patent applications cited herein are hereby incorporated by reference in their entirety for all purposes to the same extent as if each individual publication, patent or patent application were specifically and individually indicated to be so incorporated by reference.

What is claimed is:

1. A pre-filled cheese analogue package having a dry blend substantially free of casein comprising:
   a. 75%-85% starch consisting essentially of
      i. 28.86%-50.73% oxidized starch
      ii. 25.46%-53.29% octenyl succinic anhydride starch, wherein the amounts of individual starches are w/w of total dry blend;
   b. emulsifying salts at an amount up to 10%;
   c. stabilizers at an amount up to 5%; and
   d. less than 1% oil;
   wherein an analogue cheese, substantially free of casein and formed from 20%-40% of the dry blend, 30%-46% water, and 17%-28% of a fat at between 145° F. and 180° F., is firm enough for shredding and slicing at 40° F., and is emulsion stable during processing and melting.

2. The pre-filled cheese analogue package having a dry blend as recited in claim 1, wherein said package further comprises whey.

3. The pre-filled cheese analogue package as recited in claim 1, wherein said blend further comprises an acidulant.

4. The pre-filled cheese analogue package as recited in claim 3, wherein said blend contains said acidulant at an amount up to 3%.

5. The pre-filled cheese analogue package as recited in claim 3, wherein said acidulant is chosen from acetic acid, citric acid, fumaric acid, lactic acid, malic acid, phosphoric acid, and tartaric acid.

6. The pre-filled cheese analogue package as recited in claim 5, wherein said acidulant is chosen from citric acid and acetic acid.

7. The pre-filled cheese analogue package having a dry blend as recited in claim 1, wherein said emulsifying salts are chosen from sodium aluminum phosphate, sodium citrate, trisodium phosphate, and disodium phosphate, and combinations thereof.

8. The pre-filled cheese analogue package having a dry blend as recited in claim 1, wherein said blend further comprises lecithin.

9. The pre-filled cheese analogue package having a dry blend as recited in claim 1, wherein said blend further comprises coloring.

10. The pre-filled cheese analogue package having a dry blend as recited in claim 1, wherein said blend further comprises a preservative.

11. A method of making an analogue cheese comprising: combining a dry blend as recited in claim 1, a fat, and water; mixing the ingredients to form a mixture; and heating and cooling the mixture to provide an analogue cheese.

12. An analogue cheese substantially free of casein, comprising:
   15%-35% water;
   15%-35% of a fat chosen from melted fat or liquid oil; and
   40%-70% of a dry blend comprising
   a. 75%-85% of the total dry blend starch consisting essentially of
      i. 28.86%-50.73% oxidized starch
      ii. 25.46%-53.29% octenyl succinic anhydride starch, wherein the amounts of individual starches are w/w of total dry blend;
   b. emulsifying salts at an amount up to 10% of the total dry blend;
   c. stabilizers at an amount up to 5% of the total dry blend; and
   d. less than 1% oil of the total dry blend;
   wherein the analogue cheese is firm enough for shredding and slicing at 40° F., and is emulsion stable during processing and melting.

13. The pre-filled cheese analogue package having a dry blend as recited in claim 1 wherein an analogue cheese, substantially free of casein and formed from 30% of the dry blend, 43.5% water, and 23.3% of a fat.

* * * * *